(12) United States Patent
Satori et al.

(10) Patent No.: US 6,450,486 B1
(45) Date of Patent: Sep. 17, 2002

(54) LIQUID SEALED TYPE CYLINDRICAL ANTI-VIBRATION APPARATUS

(75) Inventors: Kazutoshi Satori; Yuji Mutoh; Kouji Susa, all of Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 09/364,263

(22) Filed: Jul. 30, 1999

(30) Foreign Application Priority Data

Sep. 4, 1998 (JP) .......................................... 10-251534

(51) Int. Cl.⁷ .................................. F16F 5/00; F16F 9/00
(52) U.S. Cl. .............................. 267/140.12; 267/141.2; 267/219
(58) Field of Search ........................... 267/140.12, 219, 267/141.2

(56) References Cited

U.S. PATENT DOCUMENTS

| | | | | |
|---|---|---|---|---|
| 4,625,632 A | * | 12/1986 | Markman et al. | 98/102 |
| 4,749,174 A | * | 6/1988 | Kanda | 267/140.1 |
| 4,865,299 A | * | 9/1989 | Goto | 267/140.1 |
| 5,156,379 A | | 10/1992 | Tabata | |
| 5,221,077 A | | 6/1993 | Noguchi | |
| 5,333,847 A | | 8/1994 | Kanda | |
| 5,370,376 A | * | 12/1994 | Ishiyama | 267/140.12 |
| 5,375,821 A | | 12/1994 | Toshimitsu et al. | |
| 5,429,343 A | * | 7/1995 | Maeno et al. | 267/140.12 |
| 5,489,086 A | * | 2/1996 | Kanda | 267/140.12 |
| 5,558,316 A | * | 9/1996 | Lee et al. | 267/140.12 |
| 5,657,510 A | * | 8/1997 | Satori et al. | 16/2.2 |
| 5,702,094 A | * | 12/1997 | McLelland et al. | 267/140.12 |
| 5,711,513 A | * | 1/1998 | Bretaudeau et al. | 267/140.12 |
| 5,823,488 A | * | 10/1998 | Nettekoven | 248/118 |
| 5,895,031 A | * | 4/1999 | Meyer et al. | 267/140.12 |
| 6,015,141 A | * | 1/2000 | Rudolf et al. | 267/140.12 |
| 6,029,960 A | * | 2/2000 | Gab | 267/140.12 |
| 6,068,247 A | * | 5/2000 | Rudolph | 267/140.12 |

FOREIGN PATENT DOCUMENTS

| | | | | |
|---|---|---|---|---|
| JP | 2-292540 | * | 12/1990 | 267/140.12 |
| JP | 3-066947 | * | 3/1991 | 267/140.12 |
| JP | 4-088235 | * | 3/1992 | 267/140.12 |
| JP | 4-165140 | * | 6/1992 | 267/140.12 |
| JP | 4-194430 | * | 7/1992 | 267/140.12 |
| JP | 5-272578 | * | 10/1993 | 267/140.12 |

* cited by examiner

Primary Examiner—Christopher P. Schwartz
Assistant Examiner—Melody M. Burch
(74) Attorney, Agent, or Firm—Birch, Stewart, Kolasch & Birch, LLP

(57) ABSTRACT

An outer peripheral portion of an elastic member is formed integrally to a periphery of an inner cylinder that is unconnected and intimately contacted to an inside of the outer cylinder. A partition wall is formed between a main liquid chamber and an auxiliary liquid chamber which are communicated with an orifice passage, and end walls are formed at both ends in an axial direction, whereby they are respectively adjusted to resonate by membrane in medium to high frequency range. Cooperative resonance frequency of the partition wall with the end walls are set in the medium to high frequency range. In the main liquid chamber, a stopper is projected integrally from a main liquid chamber cover which is provided along an interior face of the outer cylinder and liquid column resonance is generated respectively between the partition wall and the end walls. An outer peripheral face of the inner cylinder is formed in a shape having a non-circular cross-section and a resin-made thick wall cover is integrated on a periphery thereof.

9 Claims, 17 Drawing Sheets

LIQUID SEALED TYPE CYLINDRICAL ANTI-VIBRATION APPARATUS

BACKGROUND OF THE INVENTION

1. Field of the invention

The present invention relates to a liquid sealed type cylindrical anti-vibration apparatus used for such as an engine mount of an automotive vehicle.

2. Description of the Prior Art

Such a liquid sealed type cylindrical anti-vibration apparatus is well known which comprises an outer cylinder and an inner cylinder which are arranged with each other at an inside and an outside. In the device, an elastic member tightly connects these outer and inner cylinders by means of baking or the like and is formed of rubber as an anti-vibration body. A main liquid chamber and an auxiliary liquid chamber are provided between a liquid chamber recess formed on a part of the elastic member and the outer cylinder, these chambers are filled with working liquid and communicate with each other with an orifice passage. Some apparatus have a partition wall, which is formed at a part of the elastic member and separates the main liquid chamber and the auxiliary liquid chamber, which is formed to have relatively a thin thickness and set to a membrane-resonate by liquid flow in the liquid chambers. Other apparatus is provided with a member (hereinafter described as a medium to high frequency device) spread as an umbrella shape from the inner cylinder into the main liquid chamber so as to generate resonance by the elastic member in a medium to high frequency range.

A curve shown as a comparative example 1 in characteristics curve shown in FIG. 15 is that of an apparatus having a construction in which an elastic member is connected with an outer cylinder and the medium to high frequency device is provided therewith. With the construction, a dynamic spring constant can be reduced in a frequency range having about 200 Hz band width from about 300 to 500 Hz width in a medium frequency range by virtue of the medium to high frequency device.

Recently, it is required to lower the dynamic spring constant in wider frequency band in the medium to high frequency range. To achieve this purpose, it is considered that a partition wall is formed to be a thin thickness as stated previously so as to generate membrane resonance and the elastic member is arranged not to be connected with the outer cylinder. A characteristic curve of an apparatus in which this idea is adopted is shown as a comparative example 2, which actualize a further lower dynamic spring constant in a higher frequency range than 500 Hz. In both examples however, it is difficult to realize a low dynamic spring constant over wider band in high frequency range. A principal purpose of the present invention is to meet such a request to realize the low dynamic spring constant over wider band in the high frequency range and to expand the range to the medium to high frequency.

SUMMARY OF THE INVENTION

In order to solve the above subject, according to the present application there is provided a liquid sealed type cylindrical anti-vibration apparatus comprising: an outer cylinder and an inner cylinder arranged to be radially apart from each other; an elastic member connecting the outer cylinder and the inner cylinder; a main liquid chamber and an auxiliary liquid chamber interposed between a liquid chamber recess formed on a part of the elastic member and the outer cylinder; the main liquid chamber and the auxiliary liquid chamber are filled with working liquid, and communicated each other with an orifice passage; wherein a partition wall, which divides the main liquid chamber and the auxiliary liquid chamber, is formed by means of a part of the elastic member and is set to resonate by membrane in a medium to high frequency range. Further, the apparatus comprises a pair of end walls formed on a part of the elastic member extending in a radial direction at axially both end regions of the inner cylinder as a part of the wall portion surrounding the liquid chamber recess, these end walls are set to resonate by membrane in a medium to high frequency range, and the partition wall and the end wall are set to resonate cooperatively in a medium to high frequency range.

Since a partition wall and an end wall are set to respectively resonate by membrane in the medium to high frequency range, each wall contributes to lower a dynamic spring constant in the medium to high frequency range. Moreover, since the partition wall and the end wall resonate cooperatively, a frequency range where the dynamic spring constant is made lower is more broaden. As a result, the dynamic spring constant is made lower over much wider range than the former one.

In the present application, an axial direction is directed to a direction parallel to an axis line of the inner or outer cylinders, by a circumferential direction, a similar direction of the circumferential direction of the inner or outer cylinder, and by a radial direction a direction parallel to a radial direction of the inner or outer cylinder.

An outer peripheral portion of the partition wall may be unconnected and intimately contacted to an inside of the outer cylinder. Thereby the dynamic spring constant can be made lower in the frequency band having already lowered dynamic spring constant in the medium to high frequency range.

The liquid chamber recess of the elastic member may be covered by an auxiliary liquid chamber cover and a main liquid chamber cover. A stopper is provided to project into the main liquid chamber integrally with the main liquid chamber cover. A top portion of the stopper is arranged to be broad and a passage portion is formed around the stopper to resonate by liquid column in a medium frequency range by liquid flow accompanied by the volume variation in the main liquid chamber.

A stopper integrated with the main liquid chamber cover is used also as a medium to high frequency device which resonate by liquid column in the medium to high frequency range by means of liquid flow accompanied with volume variation in the main liquid chamber. This can realize a low dynamic spring constant in the medium to high frequency range and it become easy to form such a medium to high frequency device.

The orifice passage may be formed on an outer cylinder side surface of the liquid chamber cover covering the liquid chamber recess of the elastic member an may be connected with a similarly formed orifice passage of the elastic member. When the connected portion is viewed as a cross-section in a radial direction, an abutting face on the end region of the elastic member is slanted so that as it gets nearer to an inside, so that it overlaps more to the abutting face of the end region of the liquid chamber cover. Thereby sealing on a connecting portion between the elastic member and the liquid chamber cover can be secured. Since liquid leak can be prevented even if the orifice passage is continuously connected at the connecting portion, a long orifice passage can be easily formed.

The elastic member which partially forms the end wall is interposed between the outer peripheral ring and the inside of the outer cylinder. This portion functions as a rubber spring portion of a mass damper to control vibration input and serves to lower the dynamic spring constant.

On an outer surface of the elastic member and at a medium portion in a width direction, a seal lip having a substantially inverted-U shape in a cross-section may be formed integrally with the elastic member and on the entire periphery thereof. This makes the elastic member hard to be broken when it is press-fitted into the outer cylinder. Therefore, since the device can be assembled by press fitting, not by squeezing as in a conventional method, workability is improved.

In an axial cross-section of the elastic member the outer periphery thereof may be projected outwardly more than the seal lip which is formed on an outer peripheral end face of the end wall. This possibly makes a static spring constant of the partition wall to change by press fitting and cooperative resonance can be easily controlled.

An outer periphery of the inner cylinder may be formed in a shape having a non-circular cross-section, a thick wall cover using a different material is provided on a periphery thereof and a part facing to the main liquid chamber is formed in a flat shape.

A substantially umbrella-shaped medium to high frequency device may be provided, which projects into the main liquid chamber from the inner cylinder and set to resonate by liquid column in a high frequency range. This makes it possible that the dynamic spring constant is lowered in further higher frequency range. This result in that the dynamic spring constant can be lowered over wider frequency range spreading to high frequency range.

A drop off stopper may be provided by bending an end of the outer cylinder in a center direction and claw shaped projections may be discontinuously provided on another end. An inserted body which is integrally composed of the inner cylinder, the elastic member and the liquid chamber cover is inserted from the claw shaped projections side, and the outer cylinder and the inserted boy are integrated by bending the claw shaped projections. This enables to assemble the device by simple caulking work.

BRIEF DESCRIPTION OF THE DRAWINGS

Referring to Figures, embodiments of the present invention constructed as an engine mount for a car will be described.

DETAILED DESCRIPTION OF THE PREFERRED EMBODIMENT

Figure 1:
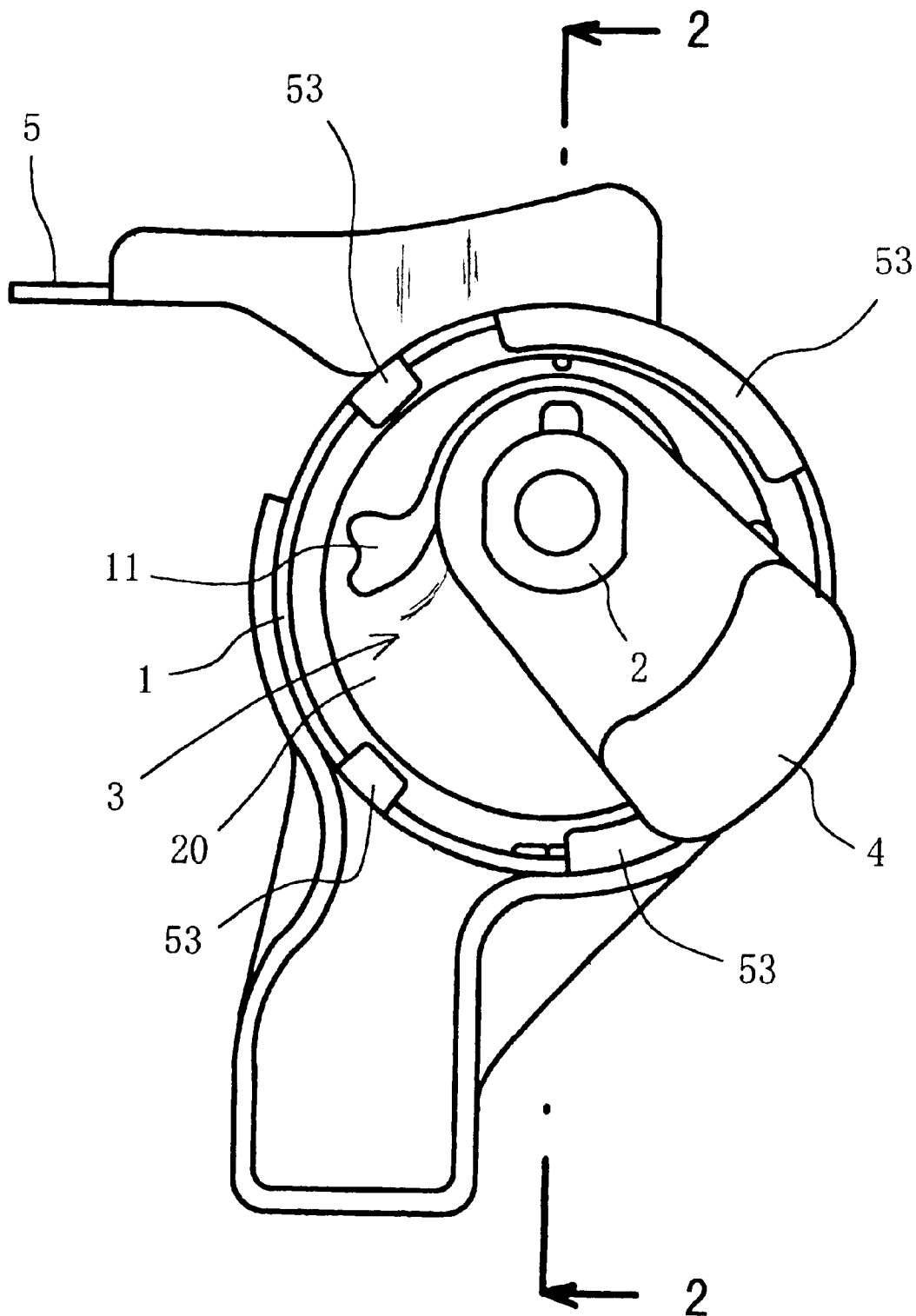
FIG. 1 is an elevational view of the engine mount according to the first embodiment.
Figure 2:
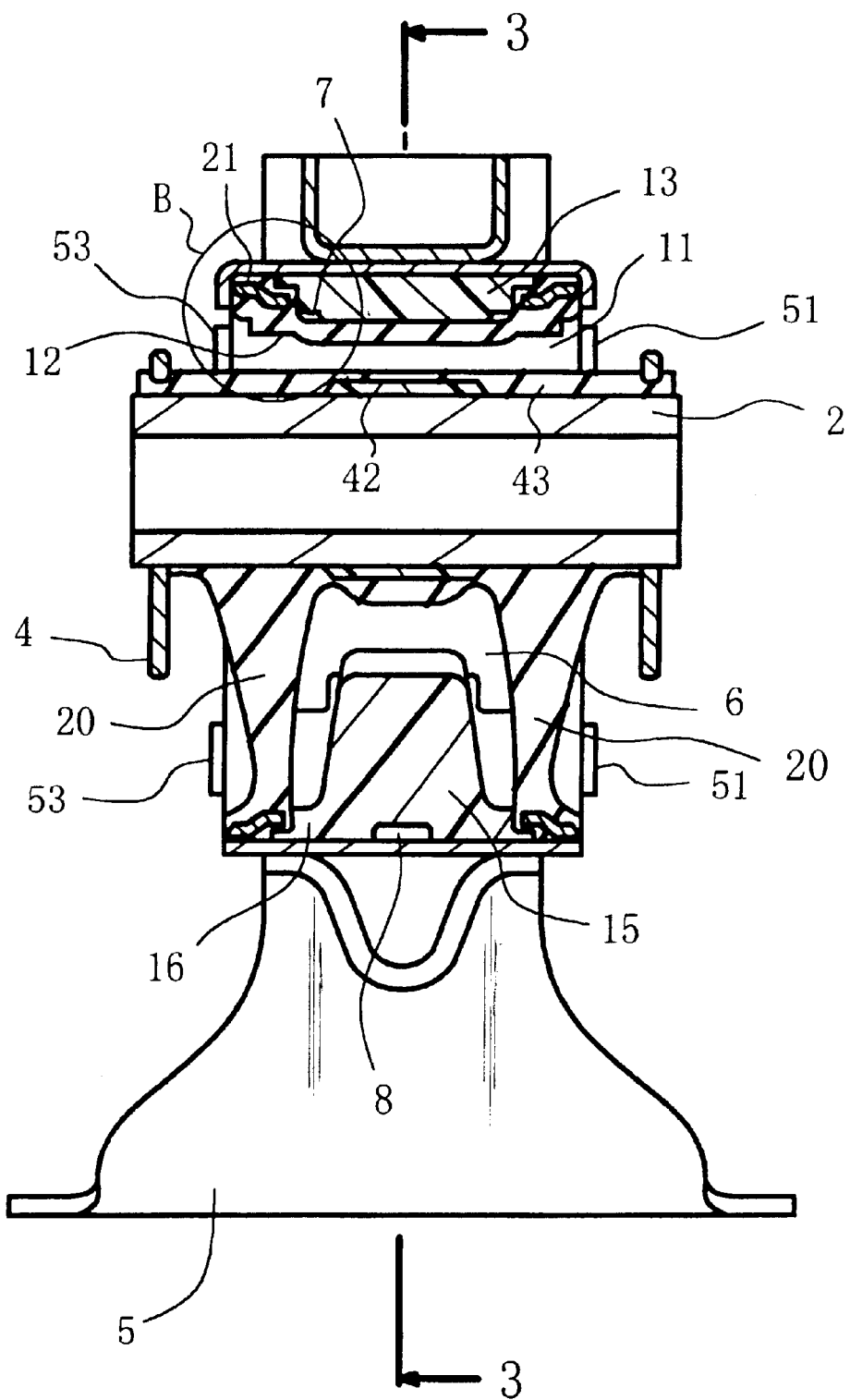
FIG. 2 is a cross-sectional view taken along line 2—2 of FIG. 1.
Figure 3:
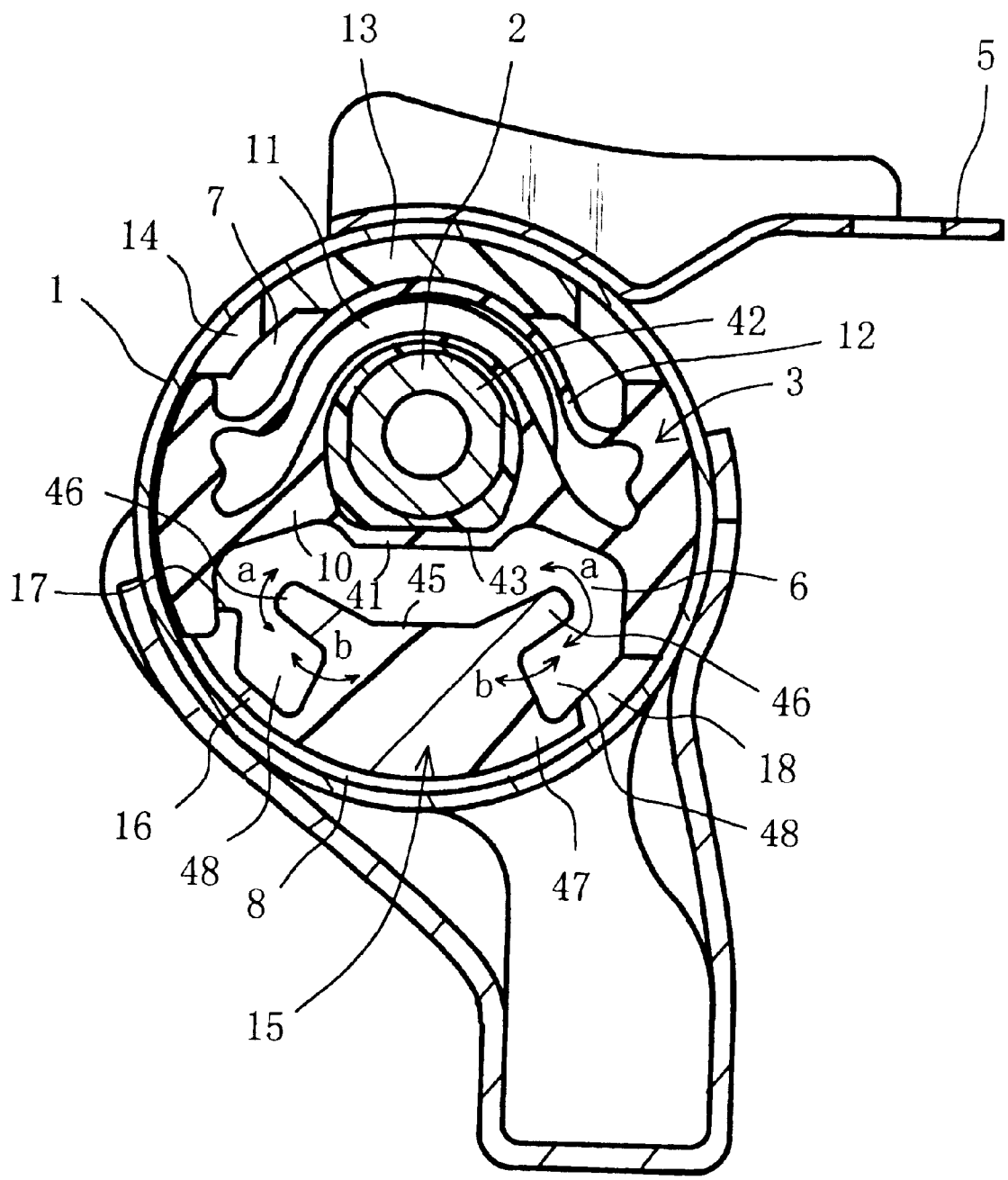
FIG. 3 is a cross-sectional view taken along line 3—3 of FIG. 2.

Referring to FIG. 1 through FIG. 3, general construction of a liquid sealed type cylindrical anti-vibration device is described. Reference numeral 1 denotes an outer cylinder, 2 an inner cylinder, 3 an elastic member, 4 an outside stopper, and 5 a fixing bracket. The inner cylinder 2 is inserted eccentrically or concentrically into an inside of the outer cylinder 1 and the rubber-made elastic member 3 is connected between the outer cylinder 1 and the inner cylinder 2. The elastic member 3 merely contacts intimately with the outer cylinder 1 and unconnect therewith.

On the other hand, the elastic member 3 is connected and integrated with the inner cylinder by insert molding around. the inner cylinder 2. At inverted positions across the inner cylinder 2, a main liquid chamber 6 and an auxiliary liquid chamber 7 are provided between the elastic member 3 and the outer cylinder 1. In these chambers uncompressible working liquid such as ethylene glycol is filled and an orifice passage communicates between both chambers.

Between the main liquid chamber 6 and the auxiliary liquid chamber 7, a partition wall 10 is formed partially by the elastic member 3. Between the inner cylinder 2 and the auxiliary liquid chamber 7 in the partition wall 10, an axial vacancy 11 is formed along the auxiliary liquid chamber 7. The axial vacancy 11 penetrates in an axial direction, and a diaphragm 12 is formed between the axial vacancy and the auxiliary liquid chamber 7. The diaphragm 12 is integrated with the elastic member 3 at an outer peripheral portion and spreads in the axial direction. In each end portion of the diaphragm 12 in the axial direction, the metal-made outer peripheral ring 21 is buried.

On an opening portion of the auxiliary liquid chamber 7, a resin-made auxiliary liquid chamber cover 13 is covered. On an end portion in peripheral direction thereof, an orifice passage outlet 14 is formed in a cutout shape and communicates to an end portion of the orifice passage 8.

In the main liquid chamber 6 a stopper 15 is accommodated. This stopper 15 is made of resin and formed integrally with a main liquid chamber cover 16 covering an opening portion of the main liquid chamber 6. On a peripheral end portion of the main liquid chamber cover 16, an abutting projection 17 is formed integrally projecting inwardly. On another end portion of the main liquid chamber cover 16 and at an intermediate portion in an axial direction, a cutout shaped orifice passage inlet 18 is formed.

On both end portions of the elastic member 3 in the axial direction, a pair of end wall 20 is formed spreading in a radial direction. On each outer peripheral portion, a metal-made outer peripheral ring 21 is integrated (see FIG. 2). The inner cylinder 2, the elastic member 3, the auxiliary liquid chamber cover 13, and main liquid chamber cover 16 composes an inserted body 22.

Referring to FIG. 4 through FIG. 9, construction of the elastic member 3 will be described. Liquid chamber recesses 23, 24 forming the main liquid chamber 6 and the auxiliary liquid chamber 7 are provided in the elastic chamber 3 opening in the radial direction. The outer peripheral portion of the elastic member except these liquid chamber recesses continues to the partition wall 10 and forms connecting faces 25 and 26 intimately connected to the inside of the outer cylinder 1. On the outer peripheral face of the connecting face 25 and at an intermediate portion in the axial direction, an orifice groove 27 forming the orifice passage is open radially outwardly and formed in the peripheral direction.

Figure 7:
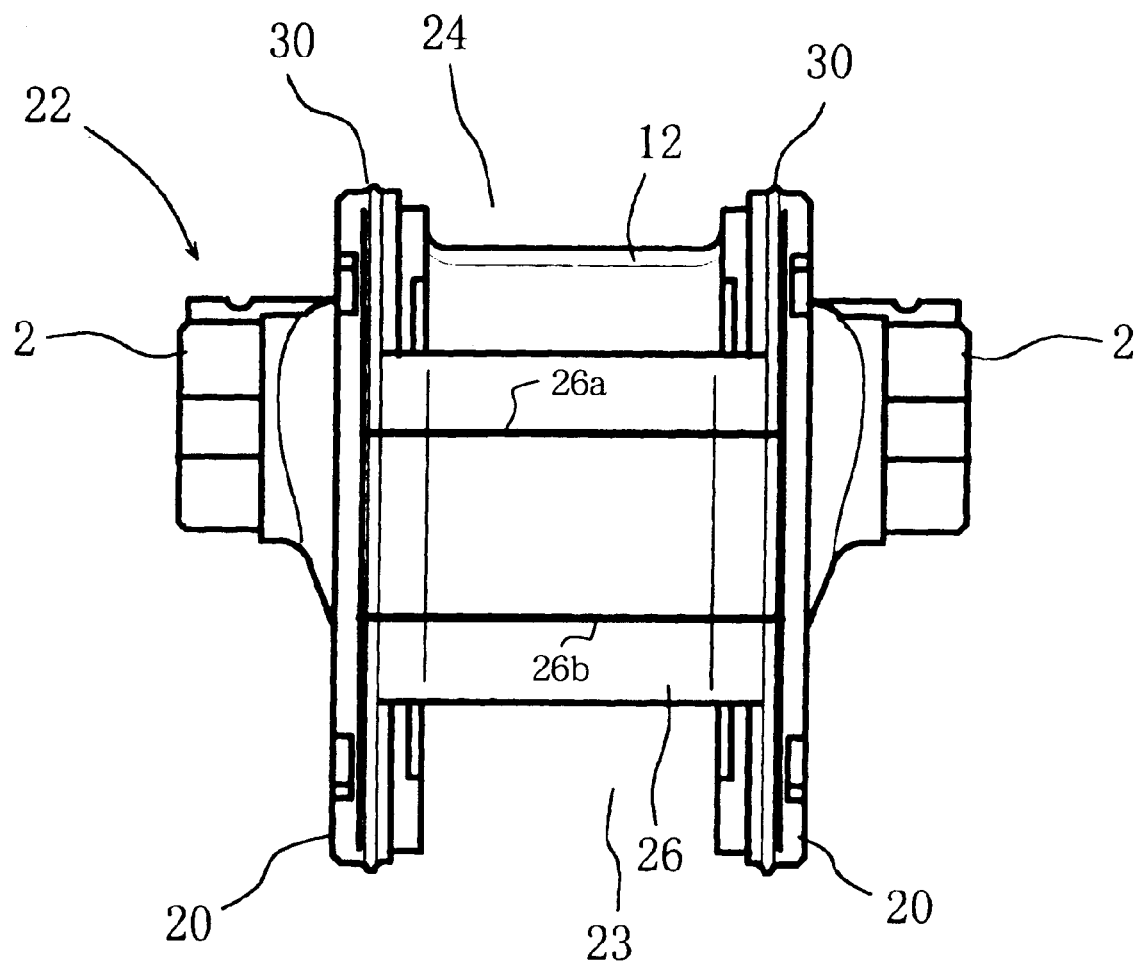
FIG. 7 is a right side view of FIG. 4.
Figure 9:
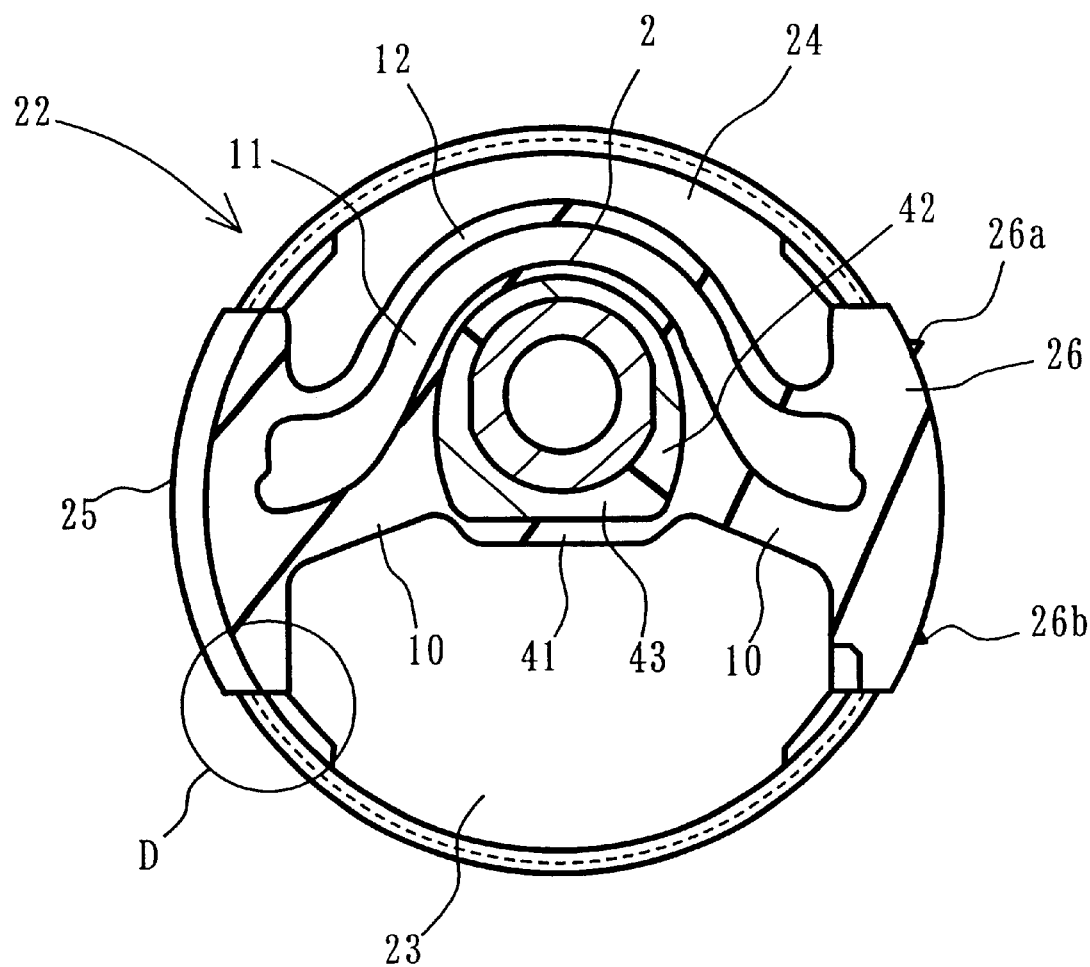
FIG. 9 is a cross-sectional view taken along line 9—9 of FIG. 6.

This orifice groove 27 is not formed on the other connecting face 26, alternatively, a pair of seal lip 26a and 26b are formed in parallel on the contacting face with the outer cylinder 1 (see FIGS. 7 and 9). As shown in an enlarged view of FIG. 5B, these contacting faces 25 and 26 projects outwardly more than the seal lip 30 by a predetermined dimension d as viewed in a cross-section in the axial direction (described in detail hereinafter). The seal lip 30 is provided on the outer periphery of each end wall 20.

Figure 4:
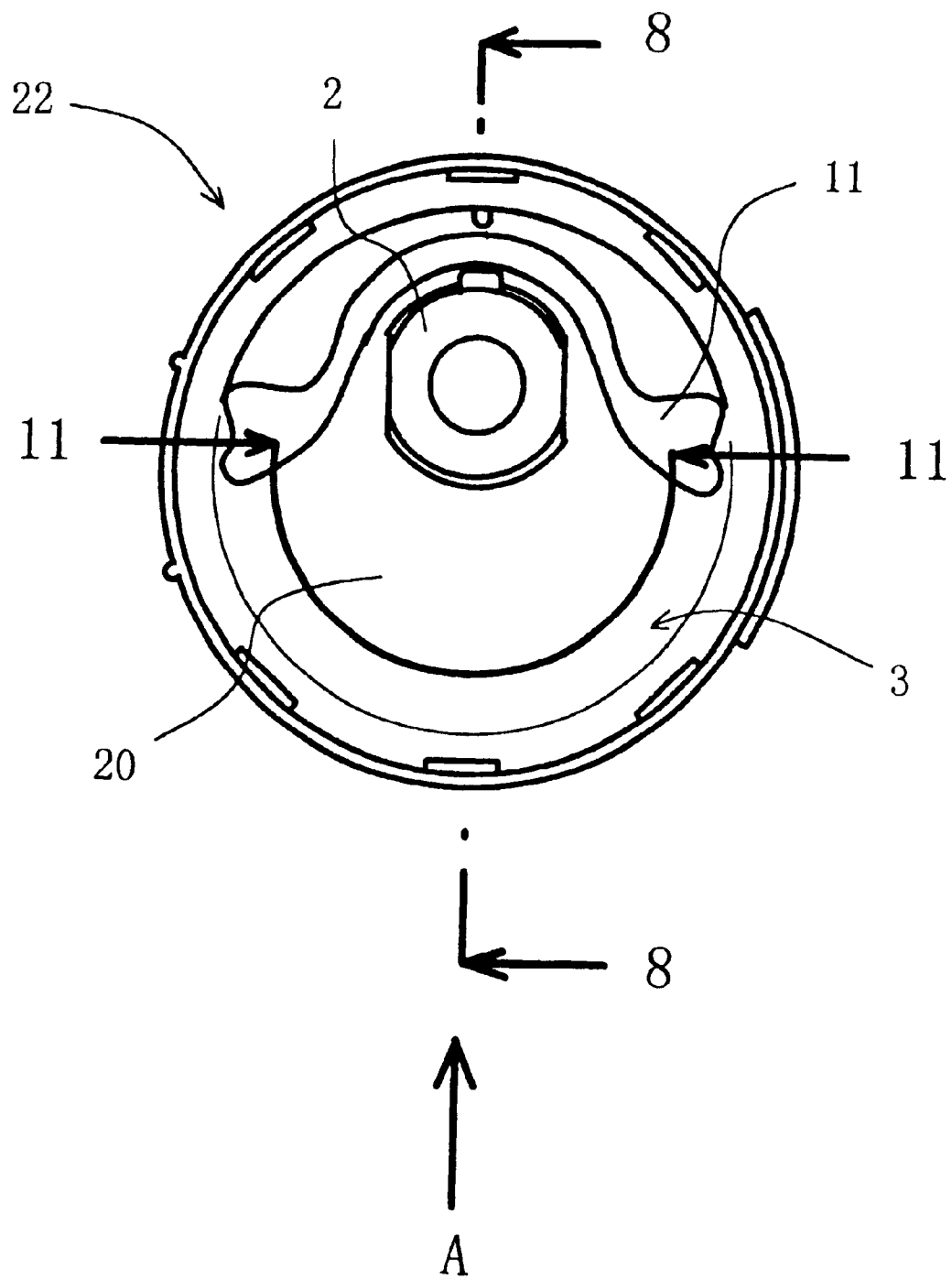
FIG. 4 is an elevational view of an inserted body.
Figure 11:
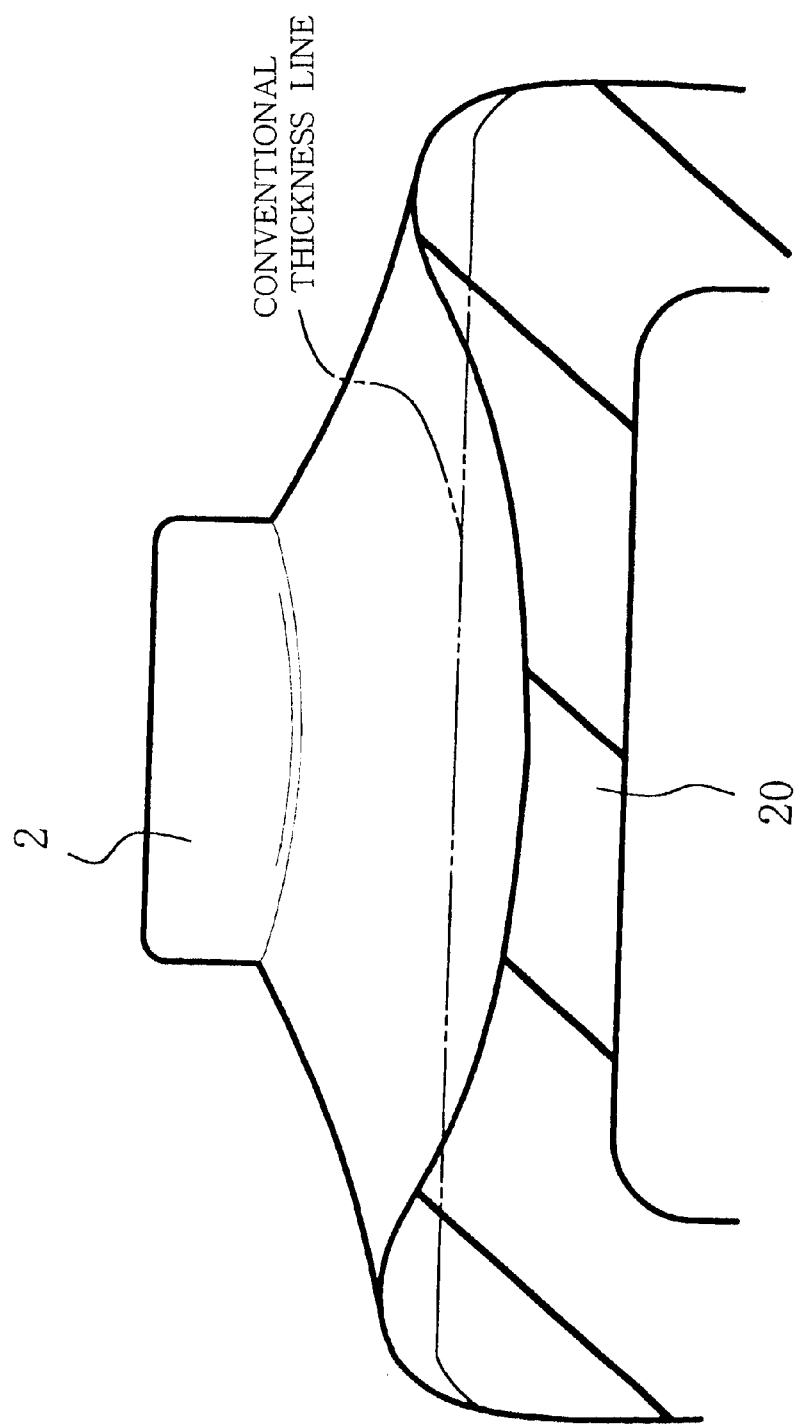
FIG. 11 is an enlarged cross-sectional view taken on line 11—11 of FIG. 4.

As shown in FIG. 11 which is a cross-sectional view taken along line 11—11 in FIG. 4 illustrating a part. composing the main liquid chamber 6, the end wall 20 is formed thicker as it gets nearer region closing to both end portions along line 11—11, namely the axial vacancy 11. Inversely, thickness of the end wall 20 varies continuously to become gradually thinner toward the intermediate portion. This makes the dynamic spring constant of the end wall 20 to lower and to resonate by membrane in the medium to high frequency range. Suitable rigidity is also obtained so as not to damage a static spring constant by forming the end wall 20 too thin. A phantom line in FIG. 11 shows a conventional general thickness of the end wall 20 not having such thickness variation.

Figure 8:
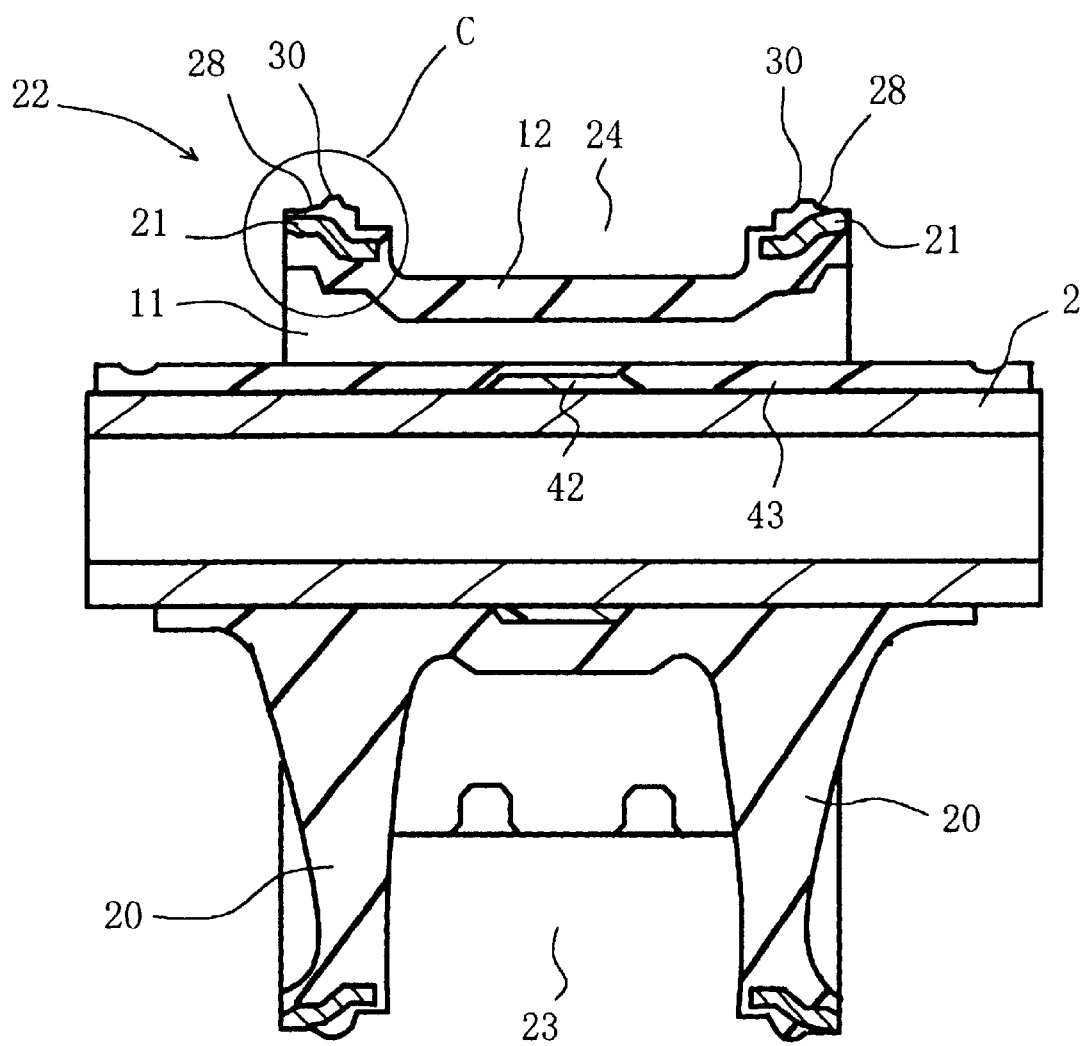
FIG. 8 is a cross-sectional view taken along line 8—8 of FIG. 4.

As is apparent from FIG. 8, the outer peripheral ring 21 is wholly buried into an outer peripheral portion of the end wall 20. In the outer peripheral portion of the end wall 20, an outer part than the outer peripheral ring 21 is arranged to be a damper rubber spring portion 28.

An axially inner portion of the damper rubber spring 28 is formed to be a step portion 29 having a small diameter. Whereon each end portion in the circumferential direction of the auxiliary liquid chamber cover 13 and the main liquid chamber cover 16 is overlapped.

For the outer peripheral ring 21, a small diameter portion 21a is formed corresponding to the step portion 29. On an outer peripheral face of the large diameter portion of the damper rubber spring 28 at an intermediate portion in the axial direction, a seal lip 30 having a substantially inverted-V shaped cross-section is formed integrally over an entire circumference thereof while projecting outwardly.

When the inserted body 22 is press-fitted to an inside of the outer cylinder 1, the seal lip 30 is squashed flat to seal between the outer surface of the damper rubber spring portion 28 and the inner surface of the outer cylinder 1. At the same time, it supports elastically an inner side than the outer peripheral ring 21 of the elastic member 3 against the outer cylinder 1 by the damper rubber spring portion 28.

Figure 12:
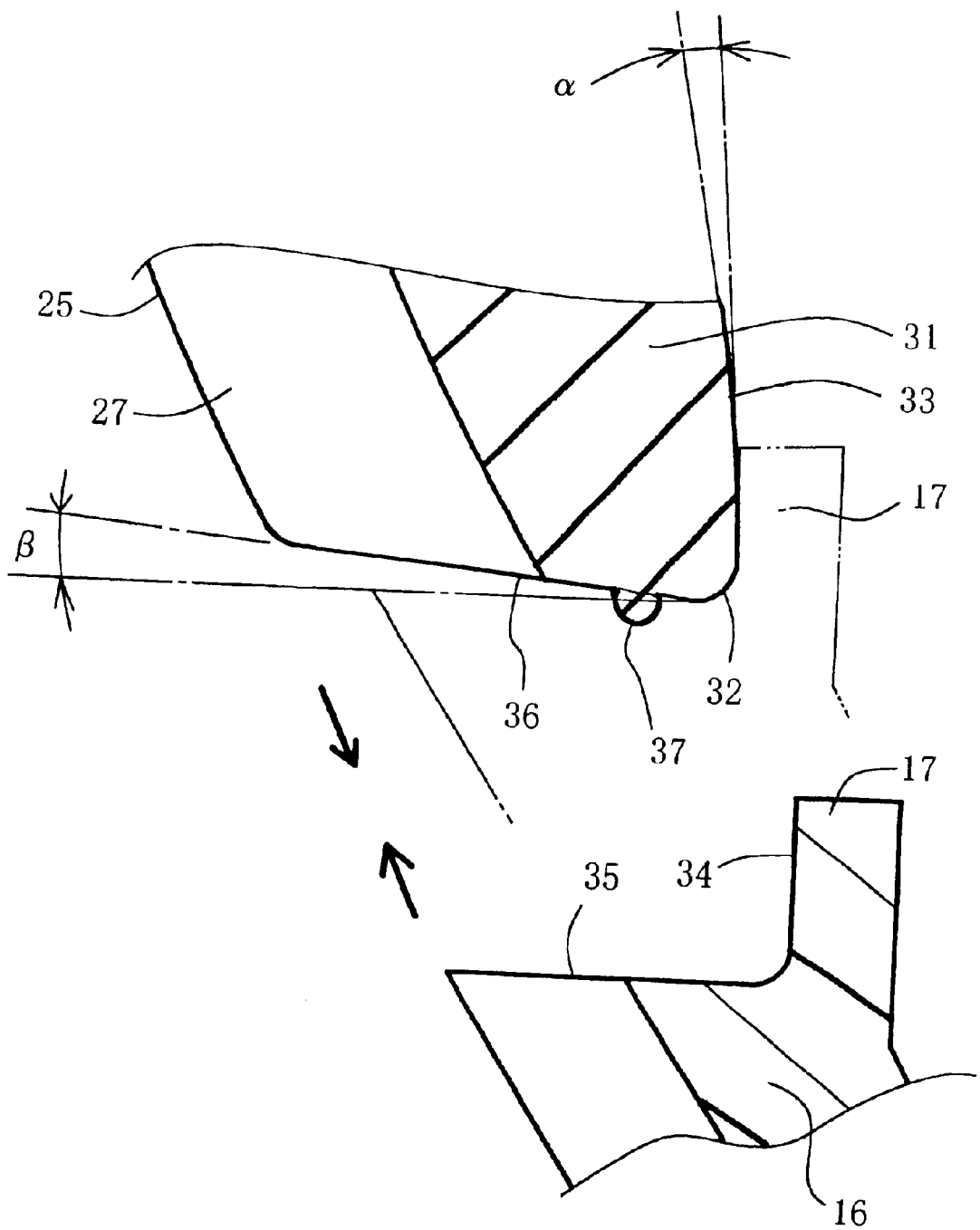
FIG. 12 is an enlarged cross-sectional view to explain a connecting construction of D part in FIG. 9.

The connecting face 25, as is shown in FIG. 9, expands in the circumferential direction. An inner periphery side corner 32 portion of a side end portion 31 of the main liquid chamber 6 in the circumferential direction is, as is shown in FIG. 12, arranged to be pushed against a base portion of the abutting projection 17. An inner peripheral face 33 near the inner periphery side corner portion 32 is arranged to form an acute angle α between itself and an abutting face 34 of the abutting projection 17.

On the other hand, a connecting end face 36 that is on the side end portion 31 and abuts to a connecting end face 35 of the main liquid chamber cover 16 is arranged to form a slant face having a slant angle β in such a way as it gets near to inside then it overlaps much more to the connecting end face 35.

As is shown in FIG. 12, a seal lip 37 is formed integrally on an end face 36 of the side end portion 31 to separate the orifice groove 27 located on an outer peripheral from an inner peripheral side and arranged to be pushed against the connecting end face 35 when contacted with the main liquid chamber cover 16.

As is shown in FIG. 9, a part between the axial vacancy 11 and the main liquid chamber 6 in the partition wall 10 is formed to be a thin wall portion. Thickness and stiffness of the thin wall portion is previously adjusted to resonate by membrane in the medium to high frequency range.

In this drawing, a central region connecting right and left thin wall portions is formed to be a stopper elastic portion 41. The stopper elastic portion 41 is arranged to be a flat portion to face each other to a top face of the stopper 15 and covers a thick wall cover 42 inside thereof Thick wall cover 42 is formed integrally to a periphery of the inner cylinder 2 using suitable material such as resin or metal to make a diameter of the inner cylinder 2 thick. A part contacting to the stopper elastic portion 41 is arranged to be a flat portion 43.

The stopper 15 comprises, as is apparent from FIG. 3, a flat top portion 45 facing each other to the stopper elastic portion 41 and a slant portion 46 extending to a neighbor of the thin wall portion formed on the periphery thereof. A recess 48 is formed between the slant face 46 and a base portion 47 on the main liquid chamber 16. The liquid column resonance having different resonance frequency is generated by virtue of working liquid in the main liquid chamber 6 flowing in two ways of a and b between the partition wall 10 and the end wall 20 through this recess 48.

Figure 13:
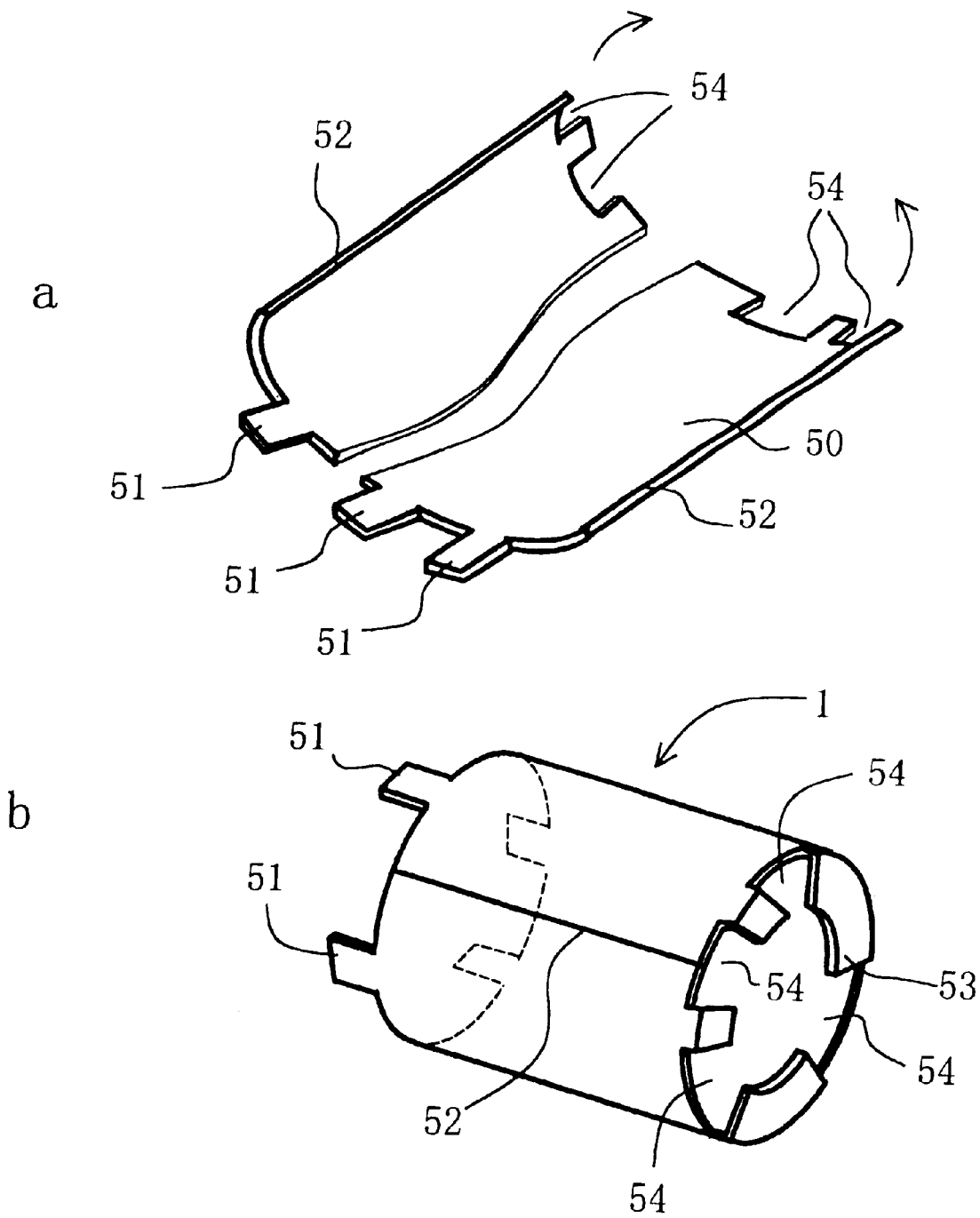
FIG. 13 is a view explaining a manufacturing method of an outer cylinder.

Referring to FIG. 13, forming method of the outer cylinder 1 will be described. The outer cylinder 1 is formed of a flat metal plate 50. On one end portion to become an end portion in the axial direction when completed, claws 51 are previously formed at suitable intervals by pressing (see FIG. 13a). It is preferable that the claws 51 are formed uniformly spaced in the circumferential direction and a number thereof is more than two, particularly more than three (an example of four is displayed in FIG. 13 and FIG. 14). In four sides of the metal plate 50, other sides than said end portion in the axial direction becomes circumferential direction end portion 52.

On another end in the axial direction, a plurality of cut-out portion 54 are provided at suitable intervals to discontinuously form the drop off stoppers 53. Length in the circumferential direction of at least a part of the drop off stoppers 53 is longer than that of the claws 51, for example, the drop off stopper 53 include an arc shaped one of substantially ⅙ of the entire circumferential length. In this stage, the drop off stoppers 53 are not bent as similar as the claws 51. This metal plate 50 is wound to become a cylinder-like shape, both circumferential end portions 52 are put together and the drop off stoppers 53 are bent by press toward an axial center (see FIG. 13b). Since each drop off stopper 53 are made to be discontinuous by the cut-out portions 54, it becomes possible to practice bending process.

Because the circumferential end portions 52 maintains connecting condition each other and do not open by bending this drop off stoppers 53, a welding process can be thereafter omitted. If necessary however, it is natural to weld this portion.

An assembling process of the inserted body 22 into the outer cylinder 1 is shown in FIG. 14a. As shown in this drawing, firstly the inserted body 22 is press-fitted from an end portion of the claw 51 side, and then a tip side of the inserted body 22 is abutted to the drop off stopper 53 for positioning (FIG. 14a). When the claws 51 are bent inwardly the inserted body 22 is secured inside the outer cylinder 1 so as not to drop off (FIG. 14b). Because a final process for drop off stopping can be achieved merely by bending of the discontinuous claws 51, the working process is easily and speedily practiced.

Next, operation of the present embodiment will be described. By virtue of communicating the main liquid chamber 6 and the auxiliary liquid chamber 7 with the orifice passage 8, inputted vibration is damped by elastic deformation of the partition wall 10 and the liquid column resonance in the orifice passage 8. Shaking of an engine is controlled in a low frequency range centering on about 10 Hz which is inputted mainly from a suspension.

In a medium to high frequency range where frequency of vibration is raised, since the outer peripheral portion of the partition wall 10 intimately contact but not connect with the outer cylinder 1, the dynamic spring constant is lowered in the high frequency range as described hereinbefore. Additionally, because the thin wall portion of the partition wall 10 and the end wall 20 resonate respectively by membrane in the medium to high frequency range, the dynamic spring constant is further lowered over wide range of medium to high frequency range by cooperative resonance thereof. Therefore, as shown in as a present application 2, by a solid line in characteristics curve of FIG. 15, lowering of the dynamic spring constant can be realized by the synthesized effect over a wide frequency range having about 350 Hz width from decrease starting frequency at about 450 Hz to rising frequency at about 800 Hz.

Figure 15:
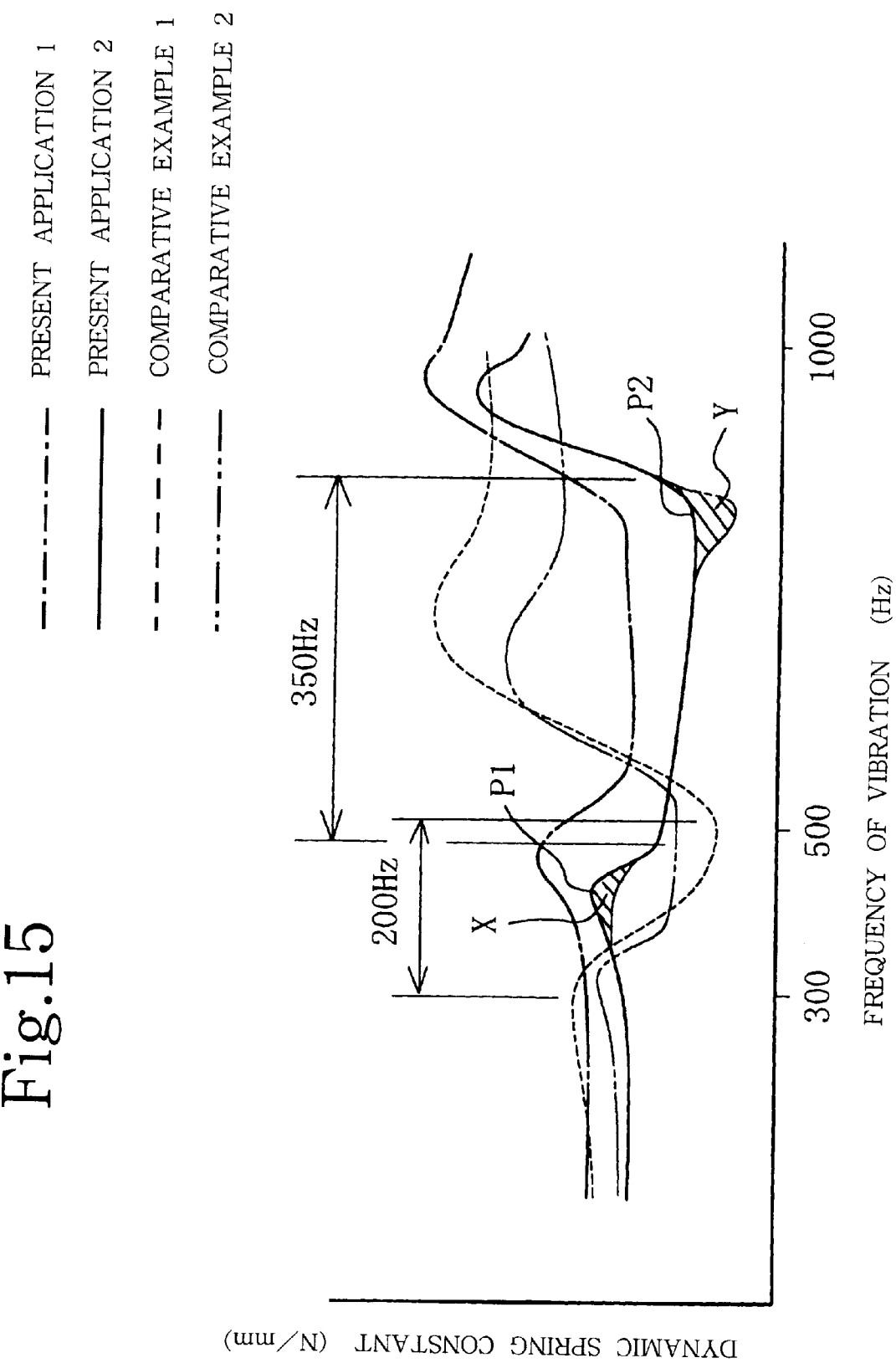
FIG. 15 is a graph showing dynamic spring characteristics of the apparatus.

The present application 1 has a characteristic curve shown by a chain line in FIG. 15. It is an example in which the outer peripheral portion of the partition wall 10 is strongly connected integrally with the outer cylinder 1 by baking or the like method as usual and cooperative resonance between the thin wall portion of the partition wall 10 and the end wall 20 is adopted. As is apparent from comparing these characteristic curves, in a case that the outer peripheral portion of the partition wall 10 is arranged to unconnect to the outer cylinder 1, it shows obvious contribution for lowering of the dynamic spring constant. However, even when the partition wall connect to the outer cylinder, comparing with a comparative example 1 and 2, it is apparent that the dynamic spring constant is considerably lowered on an average over the wide range in the medium to high frequency range.

Therefore, comparing with the conventional example, the frequency range having low dynamic spring constant is considerably widely spread. Namely it is possible to lower the dynamic spring constant over substantially entire frequency range from the low frequency range to medium to high frequency range less than 1000 Hz. Hatched areas X and Y in FIG. 15 show parts in which the dynamic spring constant is lowered by operation of the stopper 15. If the stopper is not provided, the curve becomes one not having X and Y areas which shows a condition there is merely cooperative resonance between the partition wall 10 and the end wall 20.

That is to say, it means that the stopper 15 has two functions of an original stopper as well as a medium to high frequency device. Accompanying to volume change of the main liquid chamber 6 by vibration of the inner cylinder 2, when liquid flow generated in the main liquid chamber 6 reaches to the stopper 15 such as the recess portion 48, liquid column resonance having different resonance points is generated respectively between the stopper 15, the partition wall 10 and the end wall 20. This causes it to further lower the dynamic spring constant. A small raise P1 near 450 Hz is restrained and a bottom of the dynamic spring constant close to about 800 Hz, which occurs at just lower frequency than a raise P2 near 1000 Hz, can be lowered.

Additionally, through providing the stopper 15 integrally with the main liquid chamber cover 16, man-hours for assembling and a number of parts can be reduced comparing to a case that the medium to high frequency device is fixed to the inner cylinder 2. In addition, the medium to high frequency device fixed at the inner cylinder 2 accompanies larger liquid flow. Hence when it is set to operate in the medium to high frequency range, as shown in the comparative example 1 of FIG. 15, a maximum value and a minimum value occur in relatively narrow frequency range and the dynamic spring constant largely changes. However, if the medium to high frequency device is used to fix to the outer cylinder 1 such as the stopper 15, it is possible to decrease effect of the device as shown for X and Y in FIG. 15 and to make the device complementarily operate.

The aforementioned frequency band width and the frequency where the dynamic spring constant is lowered are only an example and can be controlled optionally. That is to say, resonance points of each membrane resonance can be freely controlled by adjusting thickness and stiffness of the thin wall portion of the partition wall 10 and the end wall 20. It means that it is possible to freely control the cooperative resonance also.

Through interposing the damper rubber spring 28 between the outer cylinder 1 and the inserted body 22 at the inner side than the outer peripheral ring 21, the inserted body as a heavy object becomes a state to be supported elastically. Thus the inserted body 22 functions as a kind of dynamic damper and it can be expected to control vibration input and to still more lower the dynamic spring constant.

In addition, connecting faces 25 and 26 are contacted to the outer cylinder 1 in non-connecting condition. In that time, because the outer peripheral face of the connecting face 25 and 26 project outwardly more than the seal lip 30 at axially inverse ends, it is possible to change the static spring constant for the thin wall portion of the partition wall 10. Therefore, setting of the dynamic spring constant can be freely and finely adjusted by controlling the amount of a projection in this region. In addition, connection of the inserted body 22 to the outer cylinder 1 can be secured in a press-fit.

Figure 10:
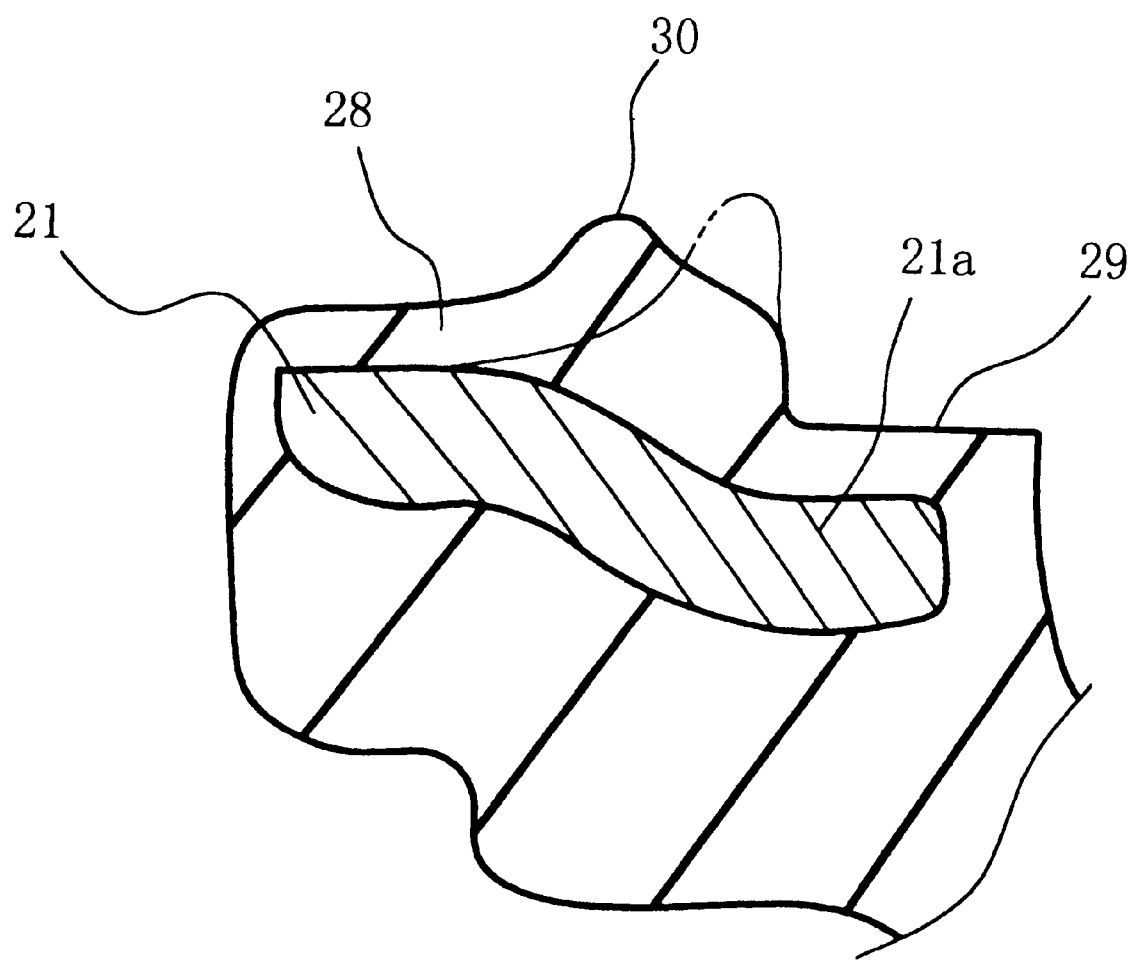
FIG. 10 is an enlarged cross-sectional view of C part in FIG. 8.

Further, the seal lip 30 of the damper rubber spring 28 is formed to have a shape of substantially inverted-U in a cross-section at the intermediate portion in the axial direction of the damper rubber spring 28. In brief, it is not formed in a shape of cliff-like facing to the step portion 29 such as a usual case shown as a phantom line in FIG. 10. Hence the seal lip 30 is resistant to be worn out when press-fitted into the outer cylinder 1 and becomes suitable for a press-fit type assembling process. Since still now the apparatus was assembled by a process in which after the elastic member had been loosely inserted into the outer cylinder, the outer cylinder was squeezed, if said former example is assembled as the present example, the seal lip is easily worn out. When the elastic member is press-fitted as the present example, squeezing process can be omitted, hence assembling becomes easy.

Furthermore, as shown in FIG. 12, the end portion 31 side connecting end face 36 on the connecting face 25 is formed to be an incline having the slant angle β to the connecting end face 35. Hence, when the connecting end face 36 is abutted to the connecting face 35 such that the inner peripheral side corner portion 32 is pushed against the base portion of the abutting projection 17, an inner part of the rubber near the connecting end face 36 is more compressed and pushed against on the connecting end face 35. This makes it sure to seal between the connecting end faces 35 and 36 and to intimately connect the end portion 31 of the connecting face 25 and the main liquid chamber cover 16. Additionally, even if the orifice passage 8 is connected at this connecting portion, liquid in the orifice passage 8 does not leak out of the connecting portion. Therefore, it is possible to bring the inlet of the orifice passage 8 along outer periphery of the main liquid chamber cover 16 to the inverse side and to make length of the orifice passage 8 sufficiently long.

Since the inner peripheral face 33 is made to be an incline having the slant angle a to the abutting projection 17, it is possible also to seal more surely the inner peripheral corner portion 32 by making intimately connect to the connecting end face 35.

Figure 5:
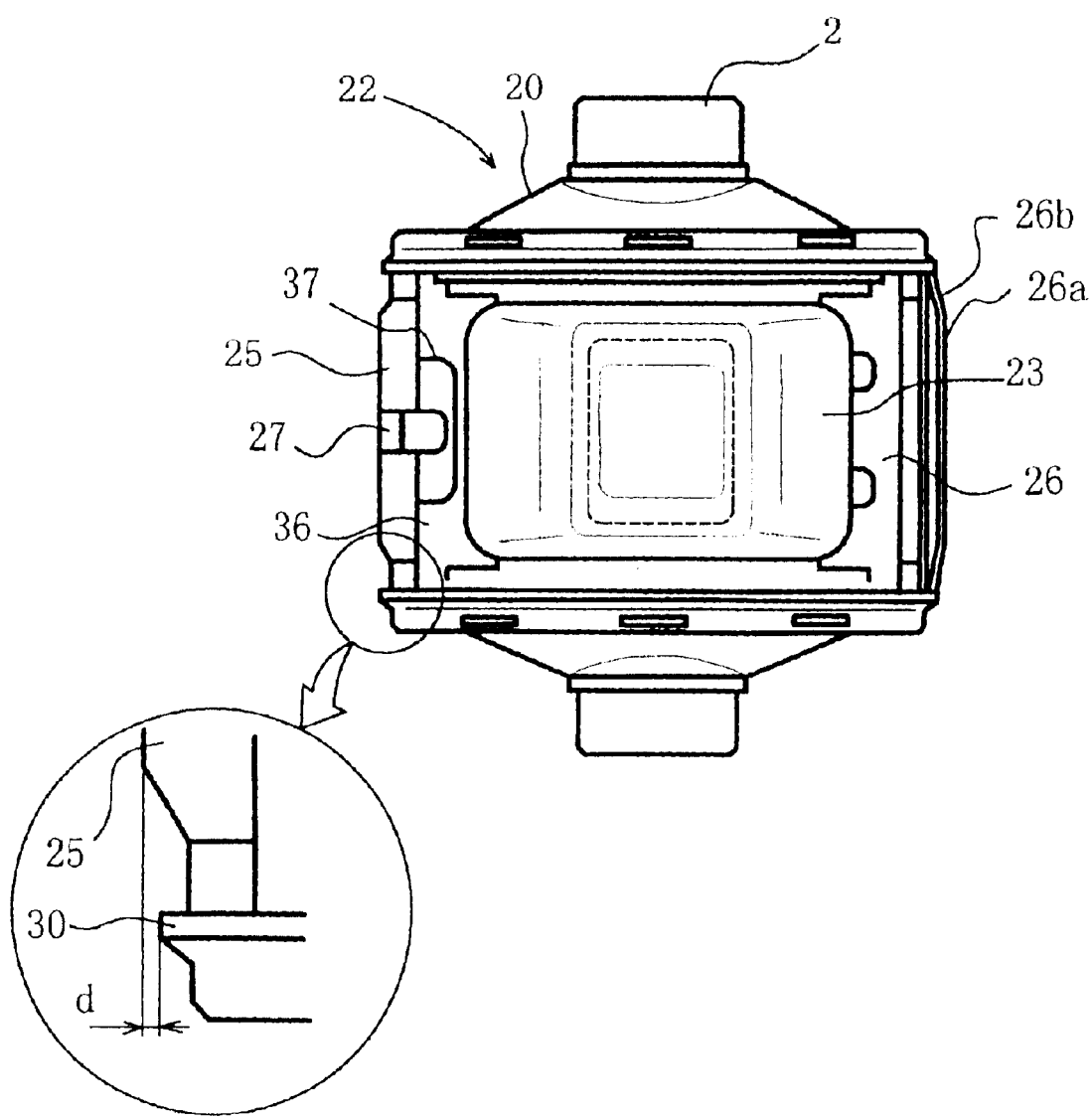
FIG. 5 is a view from an arrow A of FIG. 4.
Figure 6:
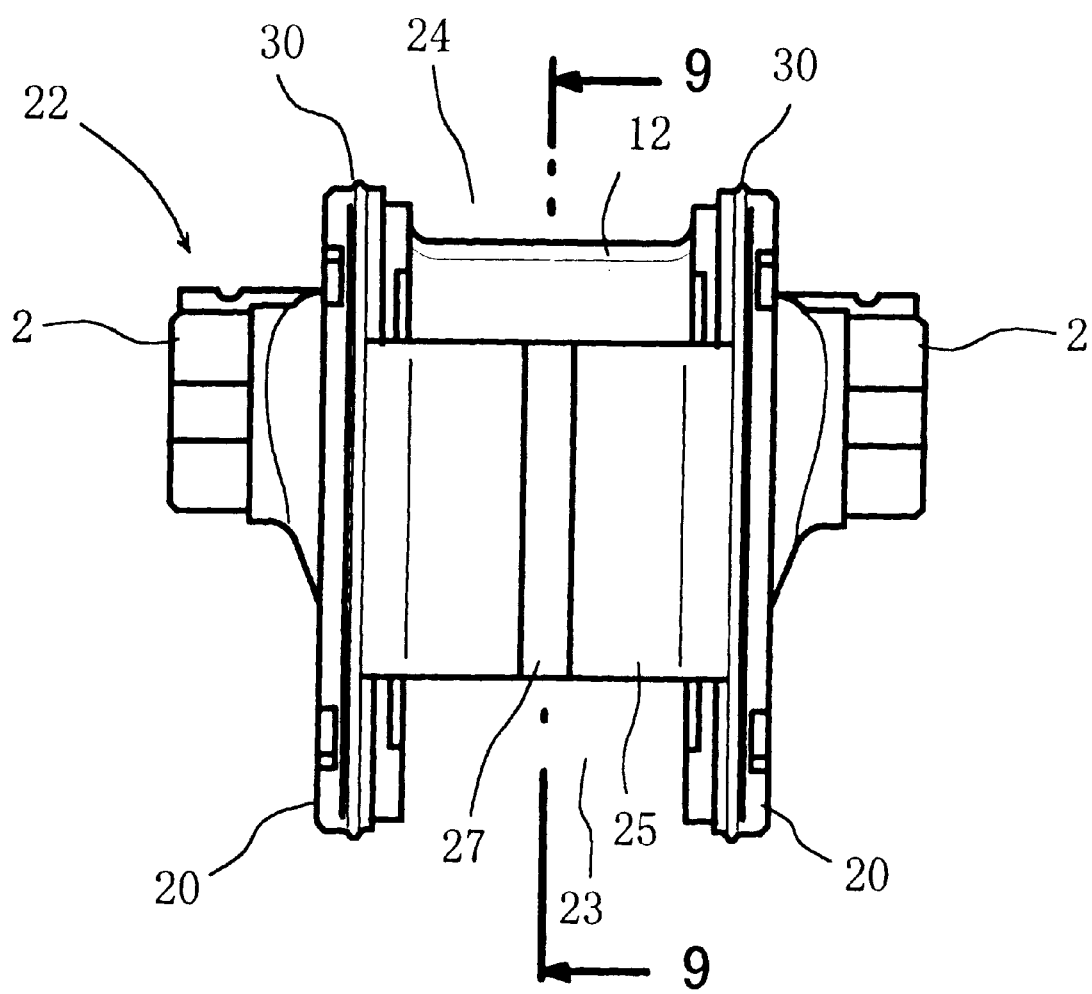
FIG. 6 is a left side view of FIG. 4.

Besides, as shown in FIG. 5, sealing on the connecting portion is made more tight to ensure connection of the orifice passage 8 through providing the seal lip 37 on the end face 36.

Further, the resin-made thick wall cover 42 is provided on the periphery of the inner cylinder 2 as shown in FIG. 9. Therefore, the manhours for manufacturing and the weight of the device can be reduced comparing to a case the whole inner cylinder 2 is formed by forging or the like method. In addition, if the inner cylinder 2 is made to have a non-circular shape with different diameter in a cross-section, a turn stopping thereof can be easily realized even when the resin-made thick wall cover 42 is provided. When utilizing a part of the thick wall cover 42, the flat portion 43 can be provided. Since the flat portion 43 widely contacts to the stopper elastic portion 41, stress concentration can be eased such that endurance of the partition wall 10 is improved.

Figure 14:
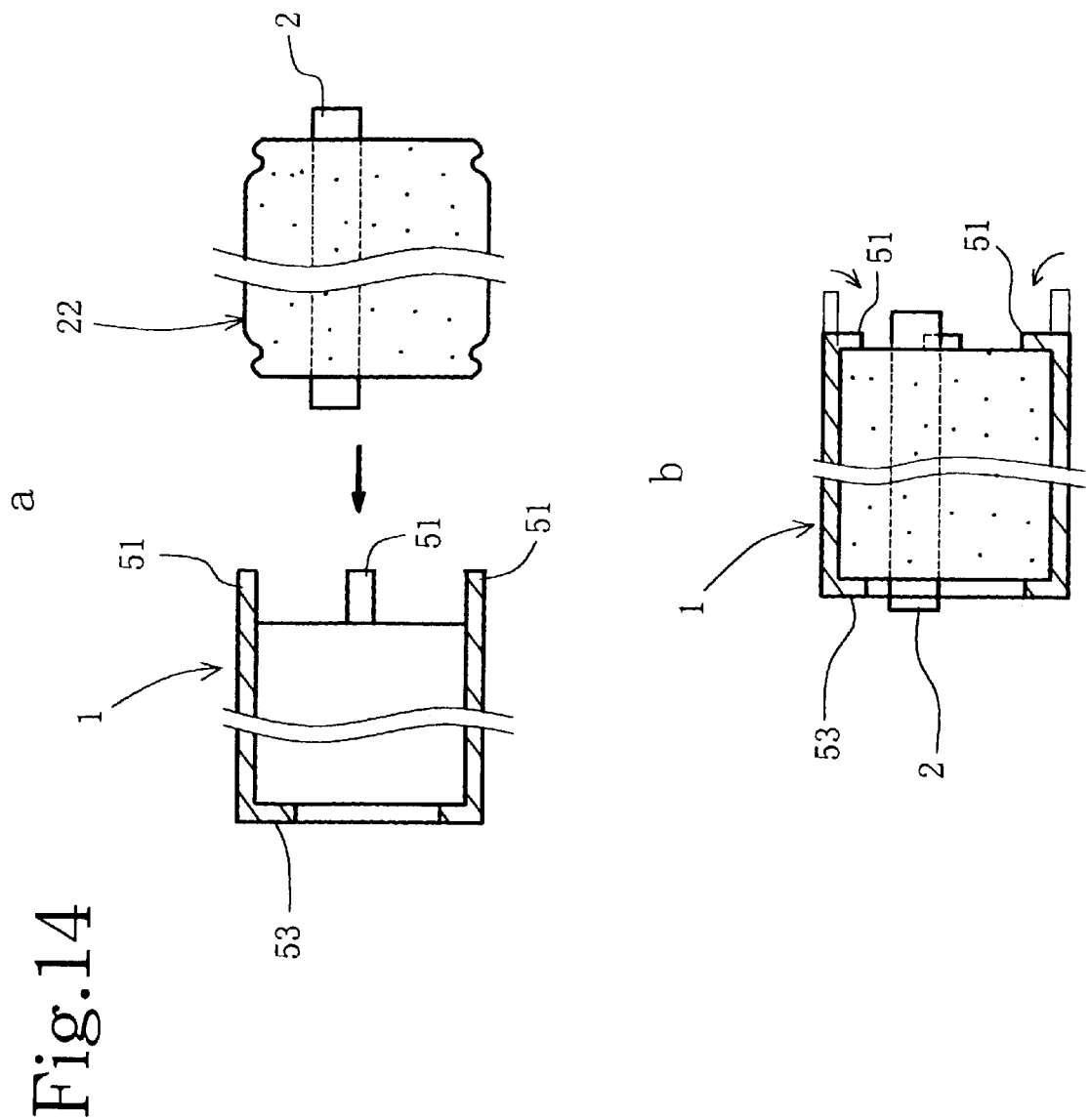
FIG. 14 is a view to explain an assembling process of the device.

Since at the axially one end portion of the outer cylinder 1, as shown in FIG. 14, the drop off stopper 53 is formed at one end portion of the outer cylinder 1 in the axial direction and the discontinuous claws 51 are provided at another end portion thereof, the inserted body 22 can be easily located when assembling. As the discontinuous claws 51 are easily bent, it is possible to stop dropping off of the inserted body 22 and to integrate with the outer cylinder 1 by an simple caulking.

Figure 16:
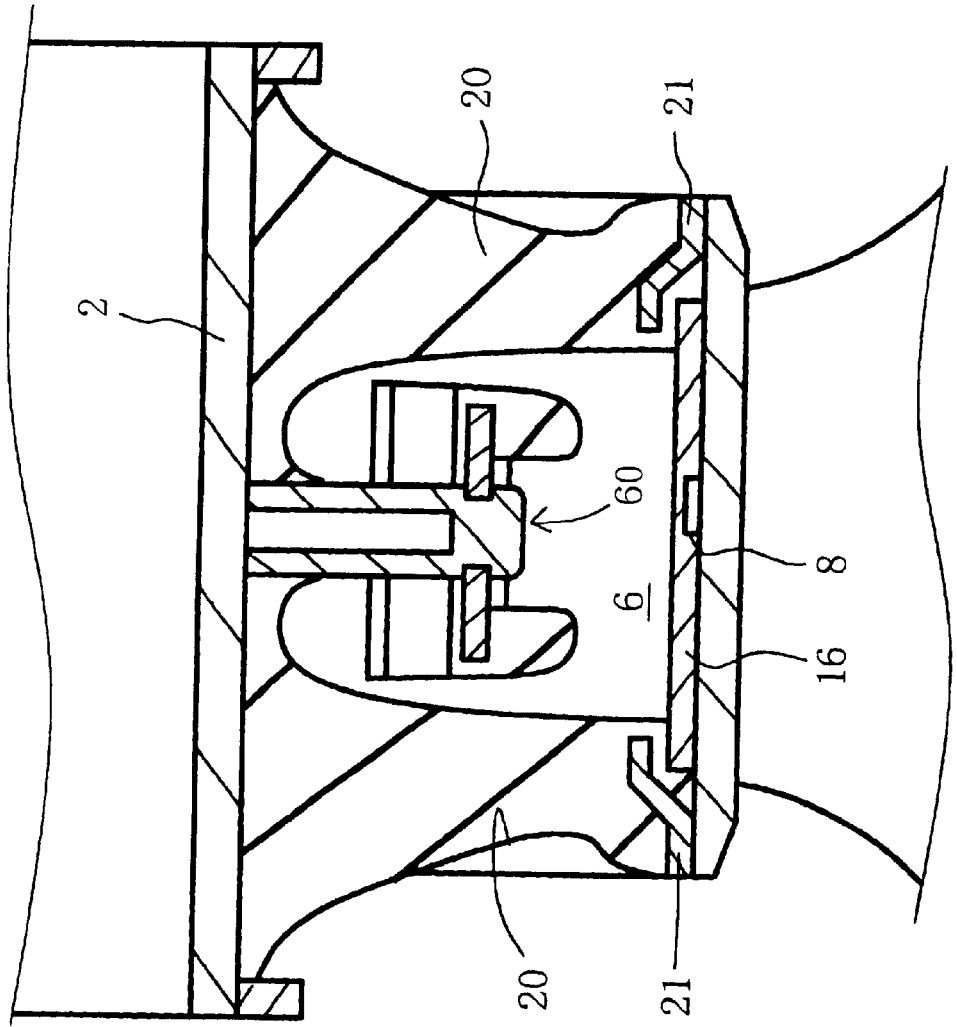
FIG. 16 is an enlarged cross-sectional view of a principal portion according to the second embodiment.

Next, referring to FIGS. 16 and 17, the second embodiment will be described. FIG. 16 is a drawing similar to FIG. 2 and a portion of the main liquid chamber is enlarged. In this example, instead of the stopper 15 in the former embodiment, a medium to high frequency device 60 is projected into the main liquid chamber 6 from the inner cylinder 2. However, this medium to high frequency device 60 is set to function in the high frequency range. It is as same as the former embodiment that the cooperative resonance is generated by each resonance of the thin wall portion of the partition wall 10 and the end wall 20, and the reference numerals are used commonly for the same functional parts.

Figure 17:
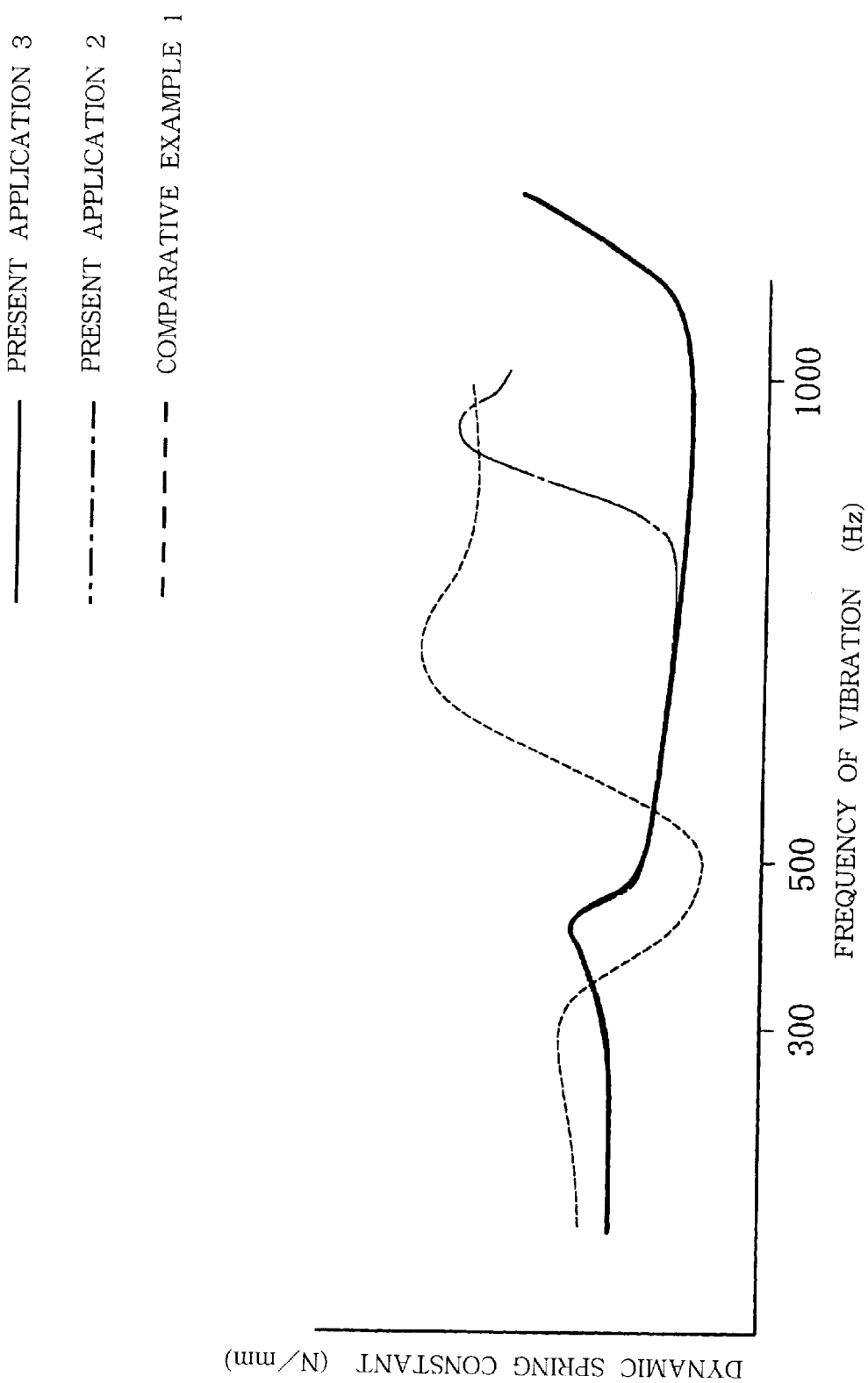
FIG. 17 is a graph showing dynamic spring characteristics thereof.

If the device is composed like this, it is possible to further lower the dynamic spring constant by the medium to high frequency device 60 as the characteristic curve of the present application 3 shown by a solid line in FIG. 17. This effect is directed to a leap in the high frequency range near about 1000 Hz shown by a chain line in FIG. 17 as characteristic curve of the present application 2. Thus the equalized low dynamic spring constant can be realized over remarkably wide frequency range from the low frequency to the high frequency more than 1000 Hz, so it achieves good effect on the vibration in substantially entire frequencies that may be occurred in running of a vehicle.

It is to be understood that the invention is not limited in above-mentioned embodiment and can be deformed in various ways. For example, it is applicable to a suspension mount and the like.

The features of the present invention, such as the forming method of the outer cylinder wall 1, fall off stopping construction, seal construction between the outer cylinder 1, and the inserted body 22, connecting construction of the connecting face 25 with the main liquid chamber cover 16, and composition of the thick cover 42 are not necessarily limited to a type of an anti-vibration mount in which the partition wall and the end wall resonate cooperatively, as in the present application. These features can be applied to a general seal liquid type cylindrical anti-vibration apparatus.

What is claimed is:

1. A liquid sealed type cylindrical anti-vibration apparatus comprising:

an outer cylinder and an inner cylinder arranged to be radially spaced apart from each other;

an elastic member connecting the outer cylinder and the inner cylinder; wherein said elastic member is provided with a liquid chamber recess forming both a main liquid chamber and an auxiliary liquid chamber, both of which are interposed between the elastic member and the outer cylinder;

said main liquid chamber and said auxiliary liquid chamber are filled with working liquid, and communicate with each other by an orifice passage, wherein the liquid chamber recess of the elastic member is covered by an auxiliary liquid chamber cover and a main liquid chamber cover, a stopper is provided to project into the main liquid chamber integrally with the main liquid chamber cover, a top portion of the stopper is arranged to be broad and a passage portion is formed around the stopper, whereby a liquid column resonance having a medium frequency range is generated by liquid flow accompanied with volume variation in the main liquid chamber, a partition wall, which divides said main liquid chamber and said auxiliary liquid chamber by extending radially from two opposing sides of the inner cylinder, is formed in a thin wall by means of a part of the elastic member and is set to resonate by membrane in a medium to high frequency range; and a pair of end walls formed in a thin wall on a part of the elastic member extending in a radial direction at axially both end regions of the inner cylinder as a part of the wall portion surrounding the liquid chamber recess, wherein said end walls are set to resonate by membrane in a medium to high frequency range, and the partition wall and the end walls are set to generate a cooperative resonance in a medium to high frequency range by arranging to synthesize the simultaneously generated membrane resonance on the partition wall and the end walls.

2. The liquid sealed type cylindrical anti-vibration apparatus according to claim 1, wherein an outer peripheral portion of the partition wall is unconnected and intimately contacted to an inside of the outer cylinder.

3. The liquid sealed type cylindrical anti-vibration apparatus according to claim 1, wherein an orifice passage inlet is formed on an outer cylinder side surface of the main liquid chamber cover covering the liquid chamber recess of the elastic member and is connected via the orifice passage to an orifice passage outlet of the elastic member, and when the orifice passage is viewed as a cross-section in a radial direction, an abutting face on an end region of the elastic member is slanted so that it overlaps more at an inner side to the abutting face of an end region of the main liquid chamber cover.

4. The liquid sealed type cylindrical anti-vibration apparatus according to claim 1, wherein a metal-made outer peripheral ring for retaining a shape is buried in a periphery of the end wall and the elastic member forming a part of the end wall is interposed between the outer peripheral ring and the inside of the outer cylinder.

5. The liquid sealed type cylindrical anti-vibration apparatus according to claim 4, wherein a seal lip having a substantially inverted-U shape in cross-section is formed along an entire periphery of an outer surface of said elastic member.

6. The liquid sealed type cylindrical anti-vibration apparatus according to claim 1, wherein in an axial cross-section of the elastic member, an outer periphery of the elastic member projects outwardly more than a seal lip which is formed on an outer peripheral end face of the end wall.

7. The liquid sealed type cylindrical anti-vibration apparatus according to claim 1, wherein an outer periphery of the inner cylinder is formed in a shape having a non-circular cross-section, a thick wall cover having a different material is provided on the outer periphery of the inner cylinder and a part facing the main liquid chamber is formed in a flat shape.

8. The liquid sealed type cylindrical anti-vibration apparatus according to claim 1, further comprising a substantially umbrella-shaped device which projects into the main liquid chamber from the inner cylinder and set to resonate by liquid column in a high frequency range.

9. The liquid sealed type cylindrical anti-vibration apparatus according to claim 1, wherein a drop off stopper is provided by bending an end of the outer cylinder in a center direction, wherein a claw shaped projections are discontinuously provided on another end, an inserted body which is integrally composed of the inner cylinder, the elastic member and a main liquid chamber cover is inserted from the claw shaped projections side, whereby the outer cylinder and the inserted body are integrated by bending the claw shaped projections.

* * * * *